United States Patent [19]
Campbell et al.

[11] Patent Number: 5,274,211
[45] Date of Patent: Dec. 28, 1993

[54] BEAM BENDER SUPPORT UNIT

[75] Inventors: Mark A. Campbell, Canton; John J. Sniezek, Dearborn Heights, both of Mich.

[73] Assignee: General Motors Corporation, Detroit, Mich.

[21] Appl. No.: 958,981

[22] Filed: Oct. 9, 1992

[51] Int. Cl.[5] .................................. B23K 26/08
[52] U.S. Cl. ......................... 219/121.78; 219/121.6
[58] Field of Search .......... 219/121.6, 121.78, 121.71, 219/121.79

[56] References Cited
U.S. PATENT DOCUMENTS

| | | | |
|---|---|---|---|
| 3,969,604 | 7/1976 | Baardsen | 219/137 |
| 4,335,296 | 6/1982 | Bredow | 219/121.67 |
| 4,603,089 | 7/1986 | Bampton | 428/593 |
| 4,634,832 | 1/1987 | Martyr | 219/121 |
| 4,684,779 | 8/1987 | Berlinger et al. | 219/121 |
| 4,694,136 | 9/1987 | Kasner et al. | 219/121 |
| 4,698,483 | 10/1987 | Marinoni et al. | 219/121.78 |
| 4,745,257 | 5/1988 | Rito et al. | 219/121 |
| 4,835,357 | 5/1989 | Schalk | 219/121 |
| 4,866,242 | 9/1989 | Martyr | 219/121 |
| 4,905,310 | 2/1990 | Ulrich | 219/121 |

FOREIGN PATENT DOCUMENTS 0-157-913 1/1984 European Pat. Off. .
86-09600 2/1986 France .
59-133985 8/1984 Japan .

Primary Examiner—C. L. Albritton
Attorney, Agent, or Firm—Anthony Luke Simon

[57] ABSTRACT

An apparatus comprises a laser generator, a laser beam delivery tube, a beam bender, a laser delivery robot, a beam bender support unit, and a three-axis adjustable head. The beam bender support unit comprises a base, a riser, and first and second support plates welded to two side faces of the riser and to the base. The beam bender support unit also comprises a horizontal support arm and first and second arm support plates mounted to the two side faces of the vertical riser and to the horizontal support arm. The beam bender is mounted to the three-axis adjustable head providing adjustment of the location of the beam bender in first and second horizontal directions and a third vertical direction, wherein the beam bender has increased isolation from floor vibrations.

10 Claims, 8 Drawing Sheets

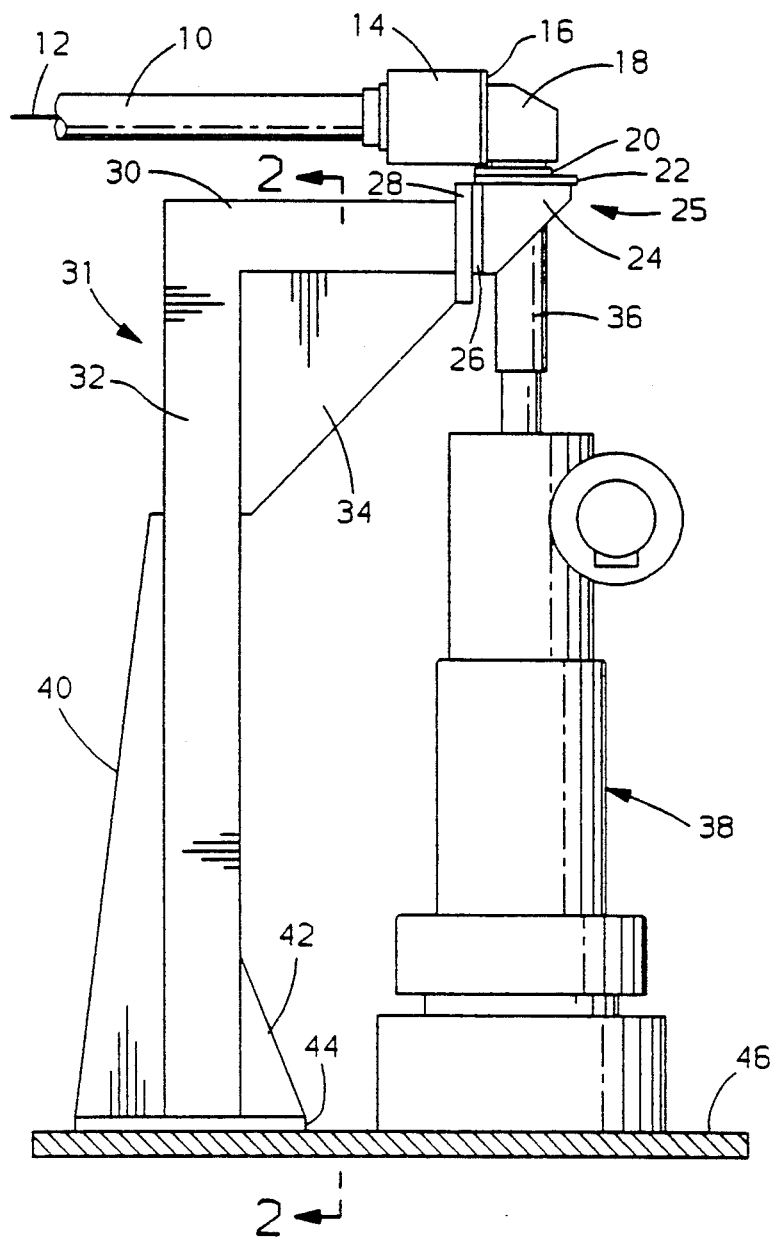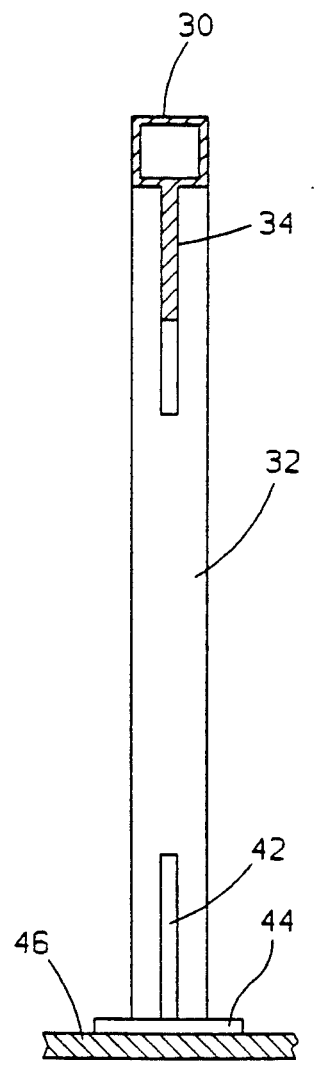
PRIOR ART
FIG. 1
PRIOR ART
FIG. 2

BEAM BENDER SUPPORT UNIT

The subject matter of this invention is related to the subject matter of copending U.S. patent application Ser. Nos. 958,823, entitled "Welding Apparatus and Process," and 958,846, entitled "Welding Process and Apparatus," all filed concurrently with this application, all assigned to the assignee of this invention, and all of the disclosures of which are incorporated herein by reference.

This invention relates to industrial laser apparatus and more particularly to an industrial laser apparatus with a beam bender support unit.

BACKGROUND OF THE INVENTION

In many industrial laser applications, an external laser generator generates a high power laser beam that is delivered through tubes and mirrors to a laser delivery robot. Examples of such systems include high power $CO_2$ lasers used in automated cutting or welding operations.

FIGS. 1 and 2 show an example prior art system. A laser beam generator (not shown) generates a laser beam 12 which travels down delivery tube 10 to beam bender 18. Beam bender 18 contains a mirror mounted in such a manner as to deflect the laser beam 12 down tube 36 to laser delivery robot 38, which may be any known type of laser delivery robot commonly available to those skilled in the art. Reference 14 designates a HeNe laser generator unit, which generates a HeNe laser beam concentric with the axis of tube 10. The HeNe laser beam is a low power visible frequency laser beam that is used for alignment purposes of the beam bender 18 and the laser delivery robot 38.

The HeNe laser beam 14 and beam bender 18 are supported on support unit 31 as shown. The support unit 31 has a base plate 44 mounted to a 1.5 inch steel plate 46 to which the laser delivery robot 38 is also mounted. A vertical riser 32 is mounted to base plate 44 and braced with gussets 40 and 42, which are welded substantially in the center of the side-walls of vertical riser 32. On top of vertical riser 32, horizontal support arm 30 is supported by gusset 34, which is welded to the center of the side-wall of vertical riser 32 and to the center of the facing down side of horizontal support arm 30, as shown. Mounting plate 28 is attached to the end of horizontal support arm 30. A support head 25 has a plate 26, which is attached to plate 28 at the end of horizontal arm 30. Two gussets 24 (only one shown) support support plates 20 and 22 to which beam bender 18 is mounted and to which plate 16, which carries the HeNe unit 14, is also mounted. The HeNe unit 14, beam bender 18 and laser delivery robot 38 are all well known to those skilled in the art.

SUMMARY OF THE PRESENT INVENTION

This invention provides a laser generator and delivery system with an improved beam bender support. Advantageously, this invention recognizes the need for improved isolation of a beam bender from environmental vibrations. Advantageously, the apparatus of this invention provides a laser generator and delivery system that provides improved isolation of the laser beam from plant vibrations. Advantageously, the apparatus of this invention provides a laser beam generator and delivery system that allows for simplified set-up due to improved alignment capabilities. Advantageously, the improved alignment capabilities of this invention provide increased precision in the alignment of the beam bender. Advantageously the apparatus of this invention provides a beam shield for a beam bender.

Structurally, the apparatus of this invention comprises a laser generator, a horizontal laser beam delivery tube, a beam bender, a vertical beam delivery tube, a laser delivery robot and a beam bender support unit. The beam bender support unit comprises a vertical riser, a horizontal arm mounted on top of the vertical riser, and two riser support plates mounted at the bottom end of the vertical riser to each side thereof and to a base plate. First and second arm support plates are mounted to the horizontal support arm and the top of the vertical riser, being welded to two outside facing surfaces of both the vertical riser and the horizontal support arm. A three-axis adjustable mounting head is mounted to the end of the horizontal support arm and supports the beam bender providing improved isolation of the beam bender from environmental vibrations and providing precise adjustment and alignment of the laser beam.

BRIEF DESCRIPTION OF THE DRAWINGS

FIGS. 1 and 2 are illustrations of the prior art.

DETAILED DESCRIPTION OF THE INVENTION

Figure 3:
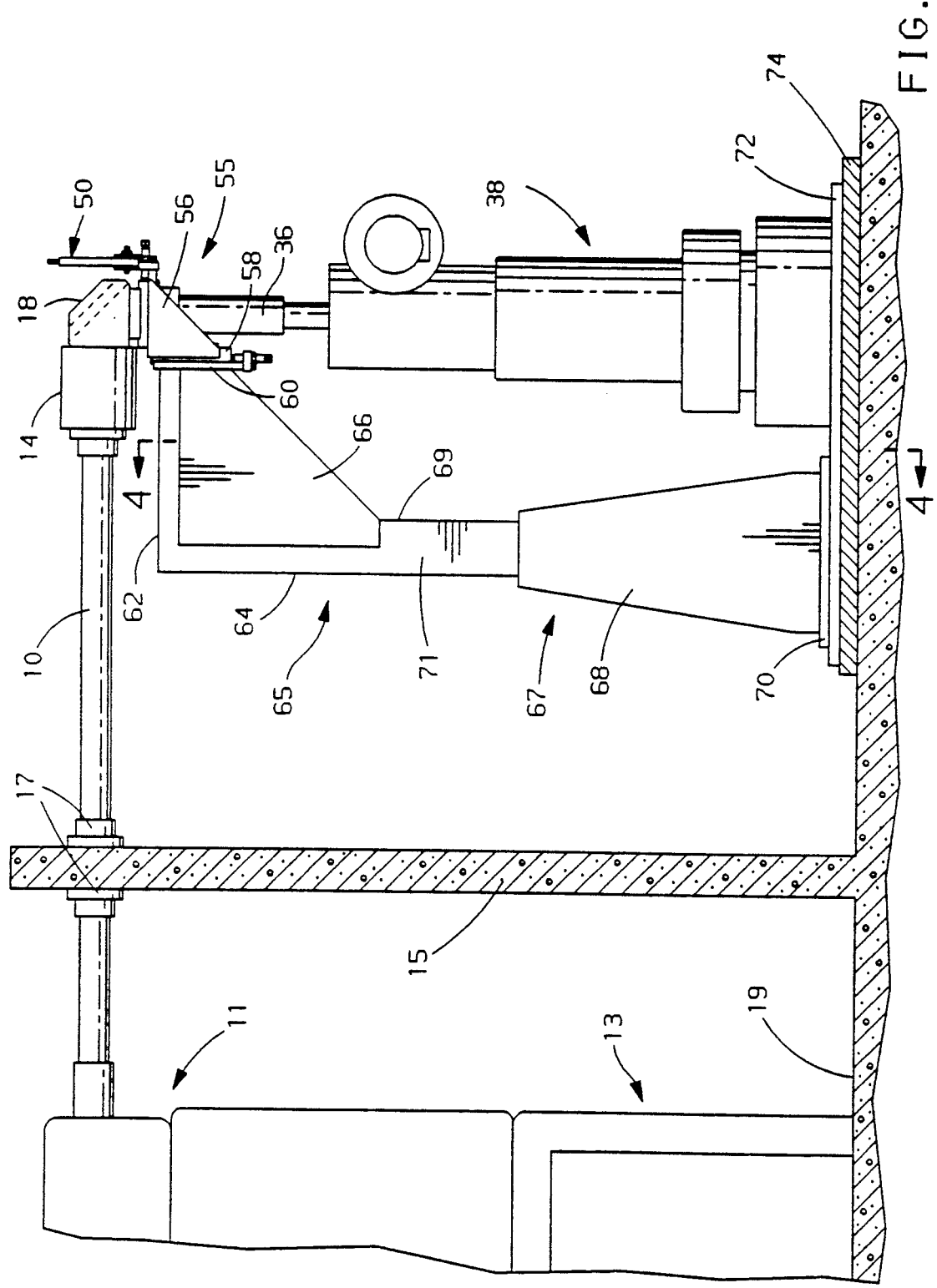
FIG. 3 is an illustration of the apparatus of this invention.
Figure 4:
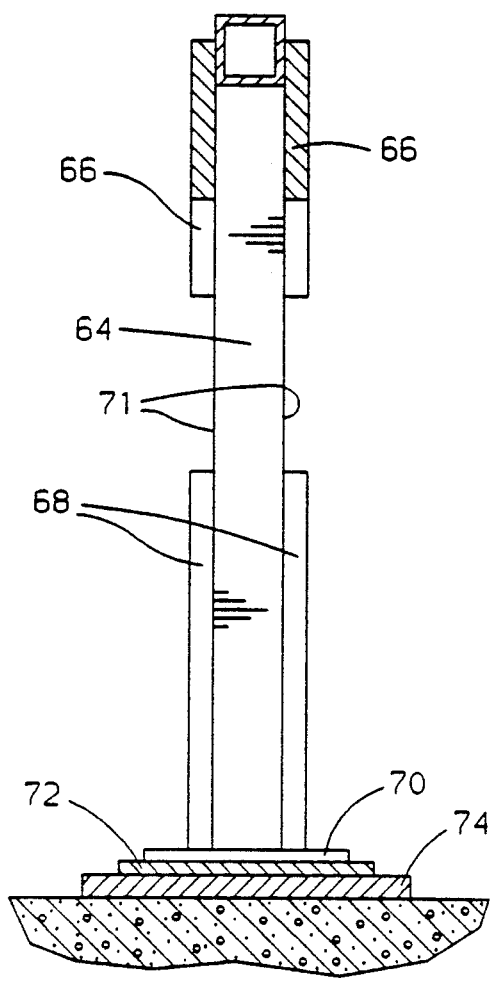
FIG. 4 is a view of a portion of the apparatus shown in FIG. 3 from the direction of arrow 67.
Figure 7:
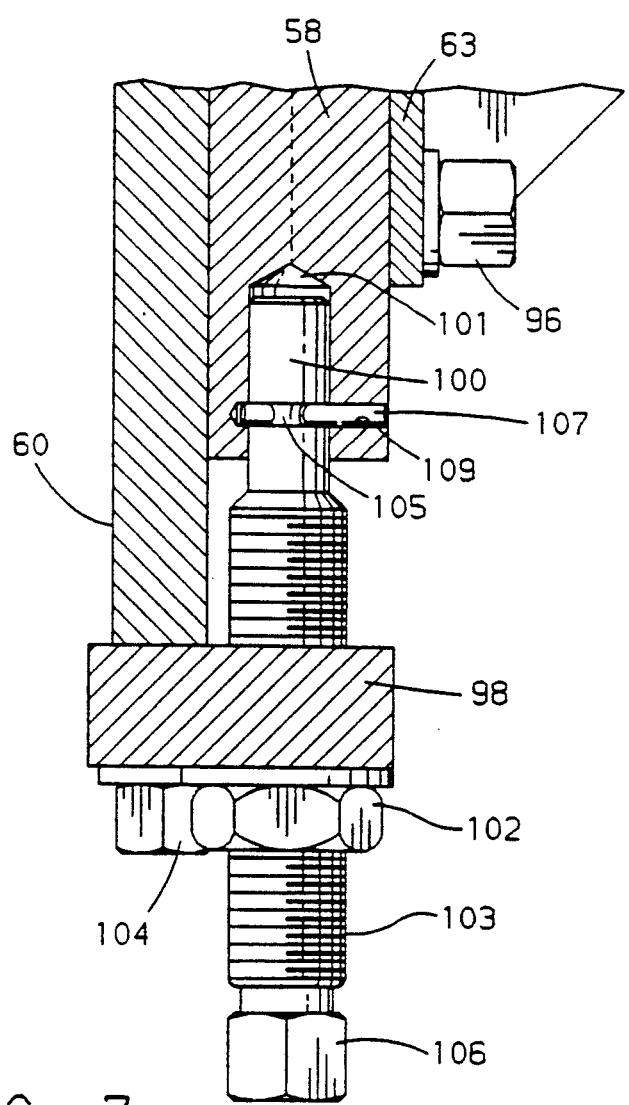
FIGS. 5, 6, 7, 8 and 9 are detailed illustrations of the beam bender and flexible mount head of this invention.

Referring to FIGS. 3 and 4, the apparatus shown includes support 13 supporting laser generator 11, which, when controlled in a manner well known to those skilled in the art, generates a laser beam 12 that travels through horizontal beam delivery tube 10 to beam bender 18. Beam bender 18 directs the laser beam 12 to the laser delivery robot 38 via tube 36.

In a typical application, the laser beam generator 11 is set up in an area with a control panel (not shown) that is readily accessible to an operator. The horizontal delivery tube 10 delivers the laser beam through a wall 15 that separates the laser delivery robot 38, which performs the laser operations, from the operator and laser beam generator 11. Flange 17 prevents access to the laser at the junction of the delivery tube 10 and the wall 15, while supporting the delivery tube 10.

In the example shown, a mounting plate 72 comprising a 1.5 inch steel plate is mounted on a grout support plate 74 on the plant floor 19. Both the laser delivery robot and the base plate 70 of the beam bender support 65 are securably fastened to the steel plate 72 by any suitable means including dowels and bolts.

The beam bender support 65 comprises vertical riser 64, which is constructed of six-inch square 0.25 inch wall steel tube stock. The vertical riser 64 is welded to the base plate 70 and has a near face 69 facing the laser delivery robot 38 and two side faces 71 comprising the sides of the vertical riser 64 perpendicular to the near face 69. A first riser support plate 68 is welded to one of the side faces 71 of vertical riser 64 and to the base plate 70 and a second riser support plate 68 is welded to the opposite side face 71 of vertical riser 64 and to the base plate 70. This portion of the structure improves rigidity of the beam bender support and provides increased isolation from vibrations in the plant floor 19 over the prior art structure shown in FIG. 1.

Figure 5:
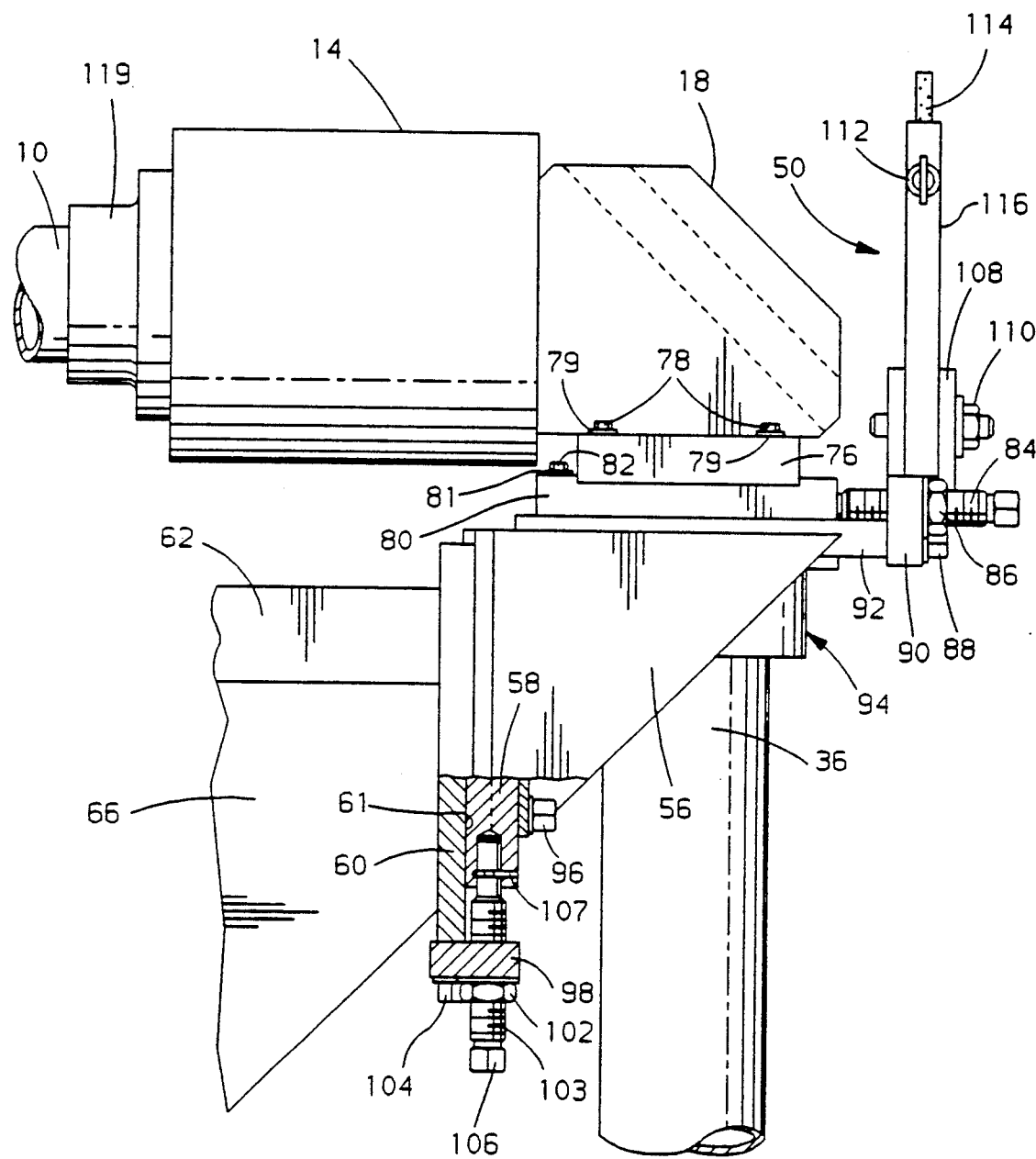
Figure 6:
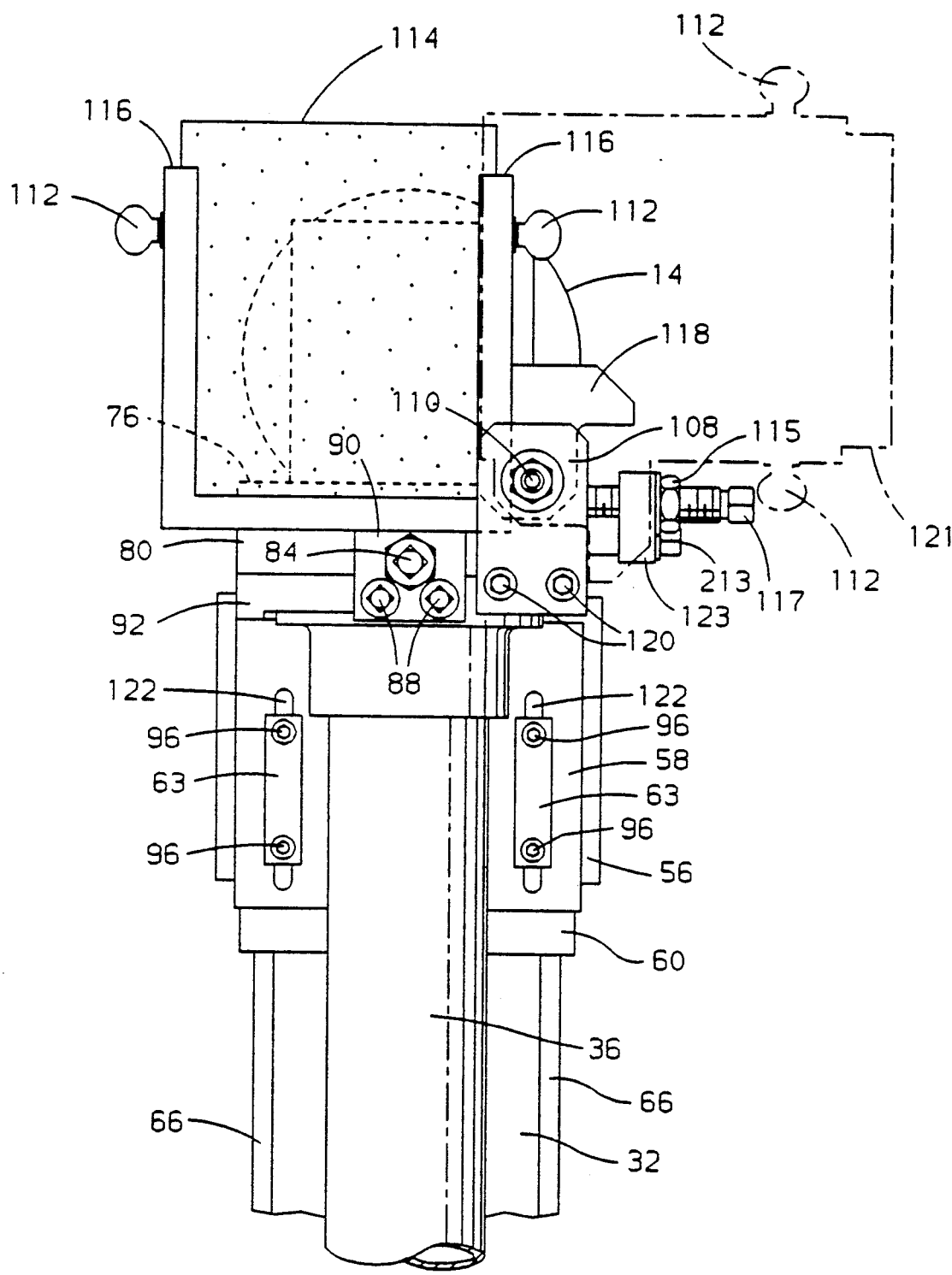

Horizontal support arm 62 is welded-to the top of vertical riser 64 and also comprises six inch square 0.25 inch wall steel tube stock. Horizontal support arm 62 is supported by two arm support plates 66, which are welded to the side faces 71 of vertical riser 64 and to the sides of horizontal support arm 62 as shown. The two side plates 66 also add to the rigidity of the beam bender support and provide added isolation of beam bender 18 from plant vibrations in floor 19 as compared to the system shown in the prior art unit of FIG. 1. On the end of horizontal arm 62 is mounted vertical support plate 60, which has a sliding surface face 61 shown in FIG. 5.

Referring now to FIGS. 5, 6, 7 and 8, vertical sliding plate 58 slidably engages vertical base plate 60 via jack screw 106, retaining plates 63, retaining bolts 96 and keyway 115. Key 113 slidably engages keyway 115 in vertical base plate 60. The keyway 115 provides precise horizontal location of vertical sliding plate 58 while allowing vertical movement of vertical sliding plate 58 relative to vertical base plate 60. Bolts 96, passing through two vertical slots 122 in vertical sliding plate 58 and engaging tapped holes (not shown) in the vertical base plate 60, retain the vertical sliding plate 58 in a fixed position against vertical base plate through bolt pressure against retaining plates 63.

During vertical adjustment of the sliding plate 58, the bolts 96 are loosened and jack screw 106 is rotated. Jack screw 106 has an end 100 that freely rotates in receptacle 101 in plate 58 and is retained therein by roll pin 107 press fit into opening 109 in plate 58 and slidably engaged in slot 105 in jack screw 106. Bolt 106 also has a threaded portion 103 that threadably engages mount 98, which is fixedly mounted to vertical base plate 60 via two bolts 104 (only one shown). Through rotation of jack screw 106 in either first or second directions, jack screw 106 through the threaded engagement with mount 98 is raised or lowered forcing vertical sliding plate 58 to be either raised or lowered. After vertical adjustment of sliding plate 58, bolts 96 are again tightened to retain sliding plate 58 in a fixed position. Additionally, lock nut 102 is tightened against plate 98 to lock jack screw 106 in place. For high resolution adjustment, the threaded engagement between jack screw 106 and mount 98 comprises fine threads.

Figure 8:
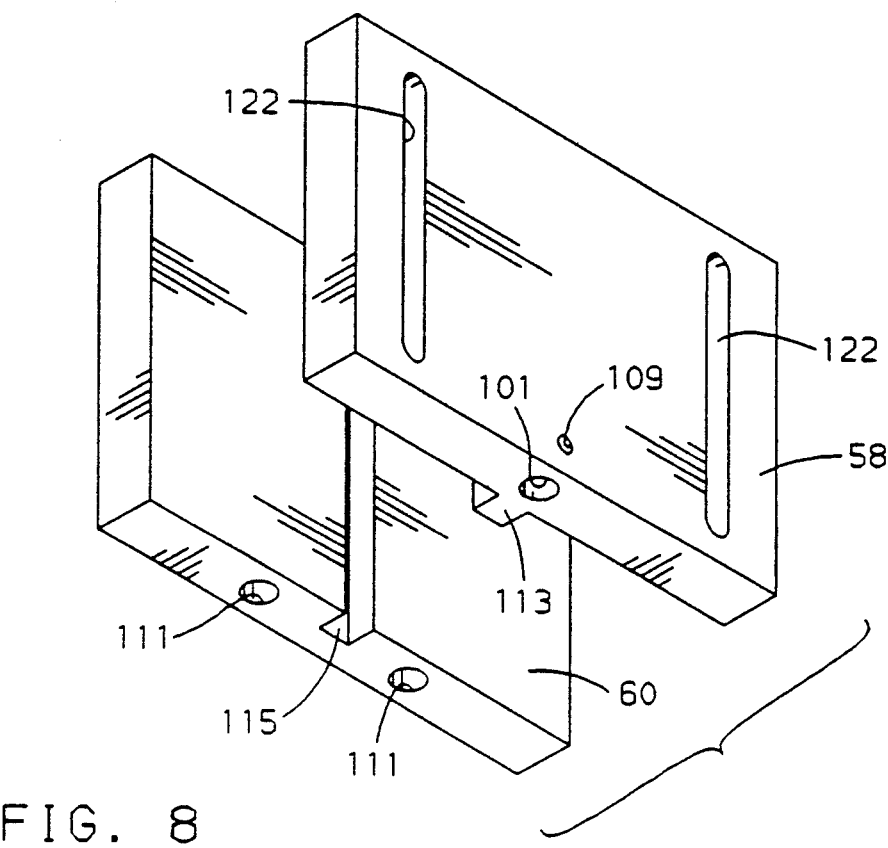
Figure 9:
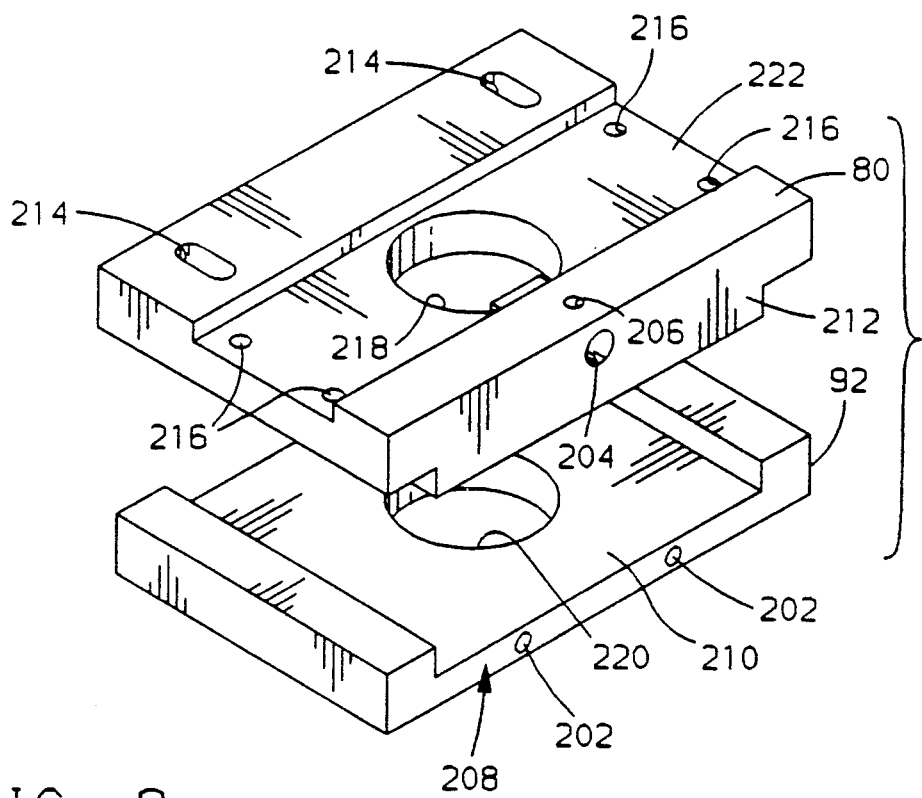

FIG. 8 illustrates the vertical base plate 60 and vertical sliding plate 58, along with slots 122, keyway 117, and mounting holes 111 to which bolts 104 are engaged.

Two supports 56 are welded to the vertical sliding plate 58 and support horizontal base plate 92. Horizontal base plate 92 has an upper machined surface defining a keyway 210 along which key 212 of first horizontal sliding plate 80, slidably engages. Mount 90 is mounted to the first horizontal base plate 92 via two bolts 88 (only one shown) engaged in tapped mounting holes 202. Mount 90 is similar to mount 98 described above and has a threaded hole (not shown) in which jack screw 84 is threadably engaged as shown.

The first horizontal sliding plate 80 has a receptacle 204 similar to the receptacle 101 of vertical sliding plate 58 through which adjustment bolt 84 is rotatably engaged and held in place via roll pin 211, similar to roll pin 107 described above. Jack screw 84 moves in the direction of its axis when rotated and forces movement of the first horizontal sliding plate 80 in the same direction. The direction of movement is one of two reverse directions, depending upon the direction of rotation of jack screw 84. Bolts 82 operate together with retaining plates 81, slots 214 in plate 80 and tapped mounting holes (not shown) in horizontal base plate 92 to lock plate 80 in place once horizontal adjustment in the direction of the elongated axis of jack screw 84 is completed. Jam nut 86 is tightened against mount 90 to lock jack screw 84 in place.

The first horizontal sliding plate 80 has a machined upper surface defining keyway 222 slidably engaging a machined lower key surface of the second horizontal sliding plate 76. Attached to the first horizontal sliding plate 80 is a mount 123, mounted by bolts 213 as shown. Mount 123 threadably engages jack screw 117, which is rotatably attached to a receptacle (not shown) in the second horizontal sliding plate 76 and retained therein by a roll pin (not shown) in a manner similar to roll pins 107 and 211. Rotation of jack screw 117 forces adjustment of second horizontal sliding plate 76 in the direction of the longitudinal axis of jack screw 117.

Similar to vertical sliding plate 58 and first horizontal sliding plate 80, horizontal sliding plate 76 has a pair of slots (not shown) through which bolts 78 protrude. Bolts 78 are threadably engaged to tapped holes 216 in first horizontal sliding plate 80 and when loosened allow adjustment of second horizontal sliding plate 76 in the direction of the axis of jack screw 117. When tightened, bolts 78 and retaining plates 79 maintain second horizontal sliding plate 76 in place. Jam nut 115 is tightened against mount 123 to retain jack screw 117 in place.

Each of the plates 92, 80 and 76 has an oversized hole (holes 218 and 220 in plates 80 and 92 and a hole not shown in plate 76) through which flange 94 and tube 36 extend the beam enclosure while ensuring that beam clipping is avoided following the alignment procedure. The beam bender 18 is fixedly attached to plate 76 by any suitable manner including mounting screws. The oversized holes of the plates 80 and 92 allow adjustment of the beam bender position 18 in the horizontal direction without interfering with the laser beam path. The tube flange 94 slidably engages the tube 36, allowing adjustment in the vertical direction while preventing access to the laser beam. Tube flange 119 slidably engages with tube 10 in the direction of travel of the laser beam within tube 10 allowing horizontal adjustment of the beam bender 18 in the direction of laser travel through tube 10, while also preventing access to the laser beam.

The HeNe laser 14 is fixedly mounted to beam bender 18 so that after preliminary alignment of the HeNe laser with respect to the beam bender 18, further adjustment of the beam bender 18 maintains the preliminary alignment.

The portion of the apparatus comprising plates 108 and 118 and U-shaped bracket 116 along with insert 114 comprise a shielding device and an alignment aid. Plate 108 is fixedly attached to horizontal base plate 92 through two bolts 120 as shown. Plate 118 is attached to U-shaped bracket 116 with an adjustable pivot mount comprising shoulder bolt 110 as shown. When in position, bolt 110 holds the U-shaped bracket and plate 118 in place, normally resting on top of mount 90 as shown. Inserted in U-shaped bracket 116 is beam shield 114, which comprises a sheet of beam absorbing material, such as Plexiglas, fixedly retained in the U-shaped bracket 116 by thumb screws 112 as shown. The beam shield 114 is useful to temporarily block laser beams in the event the laser generator emits a laser beam when the beam bender 18 is removed. Additionally, beam shield 114 acts as a target for the laser beam when aligning the laser generator 11 during installation. The alignment procedure is briefly described further below.

Gravity holds the pivoting unit in place and bolt 110 provides the pivot point. The plate 118, beam shield 114 and U-shaped bracket 116 may be pivoted out of the way of the laser beam when necessary during alignment procedures. Phantom line 121 shows the beam shield in the pivoted position.

Figure 10:
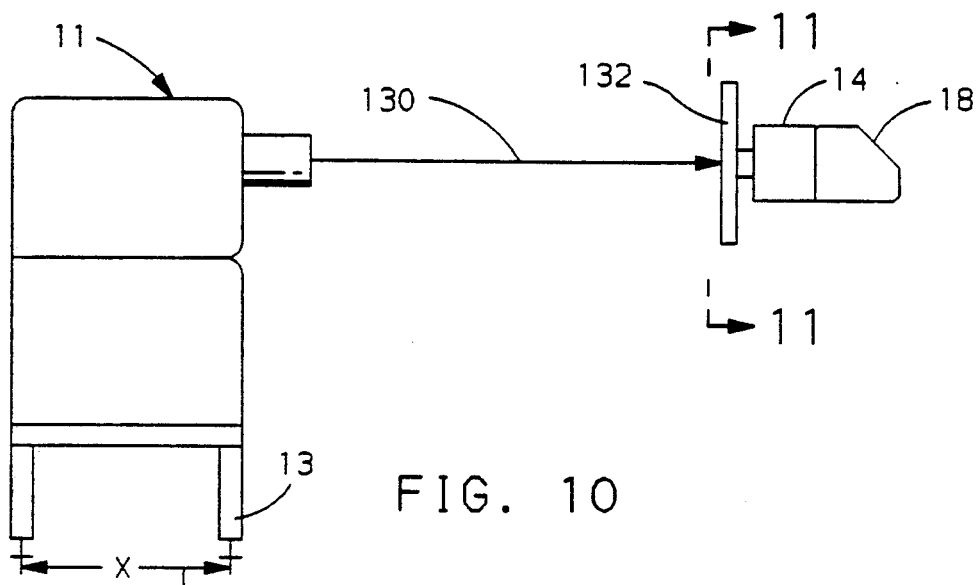
FIGS. 10, 11, 12, 13 and 14 illustrate a method of aligning a laser beam according to this invention.
Figure 11:
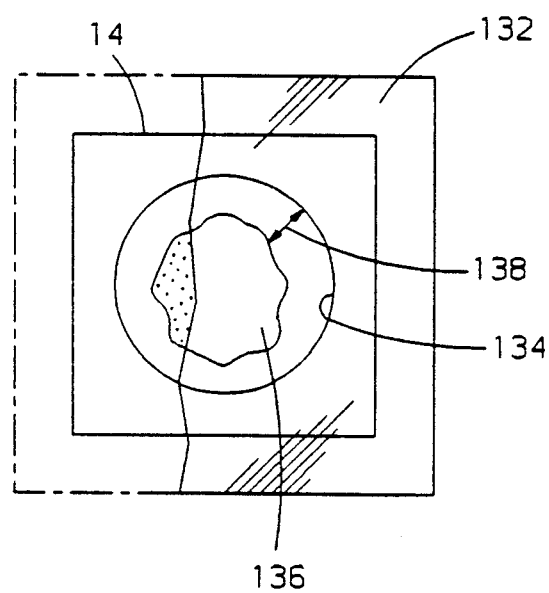
Figure 12:
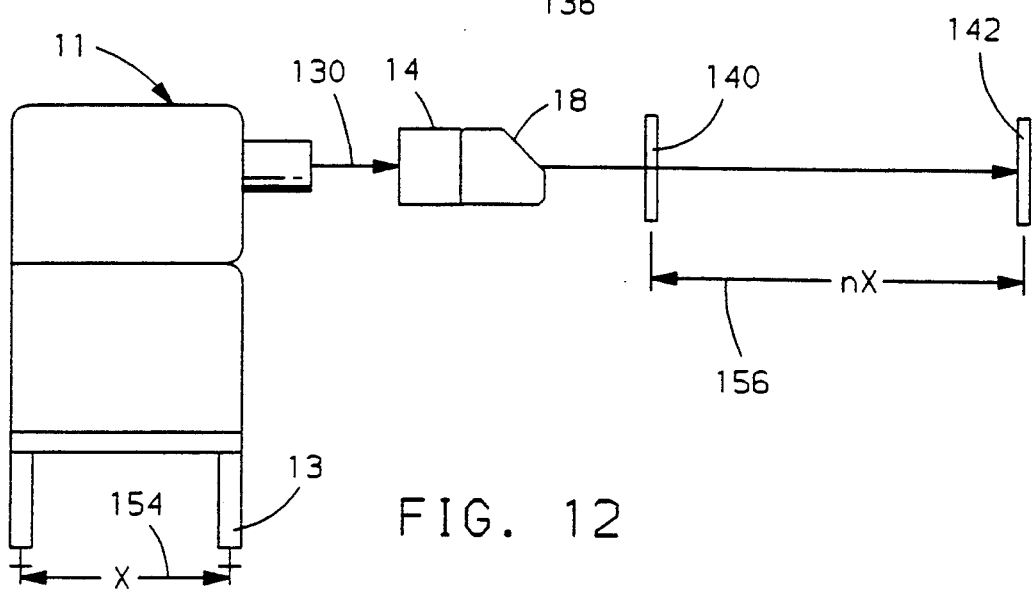

Referring to FIGS. 10-14, an example alignment procedure of the laser beam generator 11 is described. When installing a laser beam generator and a beam bender such as generator 11 and beam bender 18, it is important that the laser beam from the laser beam generator 11 enter the opening of the HeNe unit 14, or of the beam bender 18 if the HeNe unit 14 is omitted. To test whether the laser beam will enter the opening of the HeNe unit 14, target 132, comprising a piece of beam absorbing material, is placed in front of the opening of the unit 14 and a very low powered laser beam from laser generator 11 is pulsed to intersect with target 132. The laser beam burns a mark in the target 132 that is used as an indication of the orientation of the laser beam. After a burn is made in the target 132, the generator riser unit 13 is adjusted, if necessary, to ensure that the laser mode burn 136 on the target 132 is substantially concentric with the opening 134 of HeNe unit 14 as shown in FIG. 11. Ideally, the space between the outer edge of the burn 136 and the periphery of the opening 134, indicated by reference 138, is about one-quarter of an inch.

After the preliminary alignment of the laser beam with the beam bender 18 and HeNe unit 14, two additional beam-absorbing targets 140, 142 are set up as shown. The distance 156 between the targets 140 and 142 is preferably a whole number multiple of the length of the support of laser generator 11 in the direction of laser beam 130 as illustrated by references 154 and 156 in FIG. 12. For example, if the length 154 of laser generator riser 13 is X, then the length 156 is preferably nX, where n is a whole number. The first target 140 may be mounted in U-shaped bracket 116 (FIG. 5) and is exposed to the HeNe beam, whose position is marked on the target by an operator, preferably on the backside or on the front side extending outside the probable burn area for the $CO_2$ laser beam. The first target 140 is then exposed to a brief burst of the $CO_2$ laser beam and then the process is repeated for the second target 142, with the first target pivoted out of the beam path.

Figure 13:
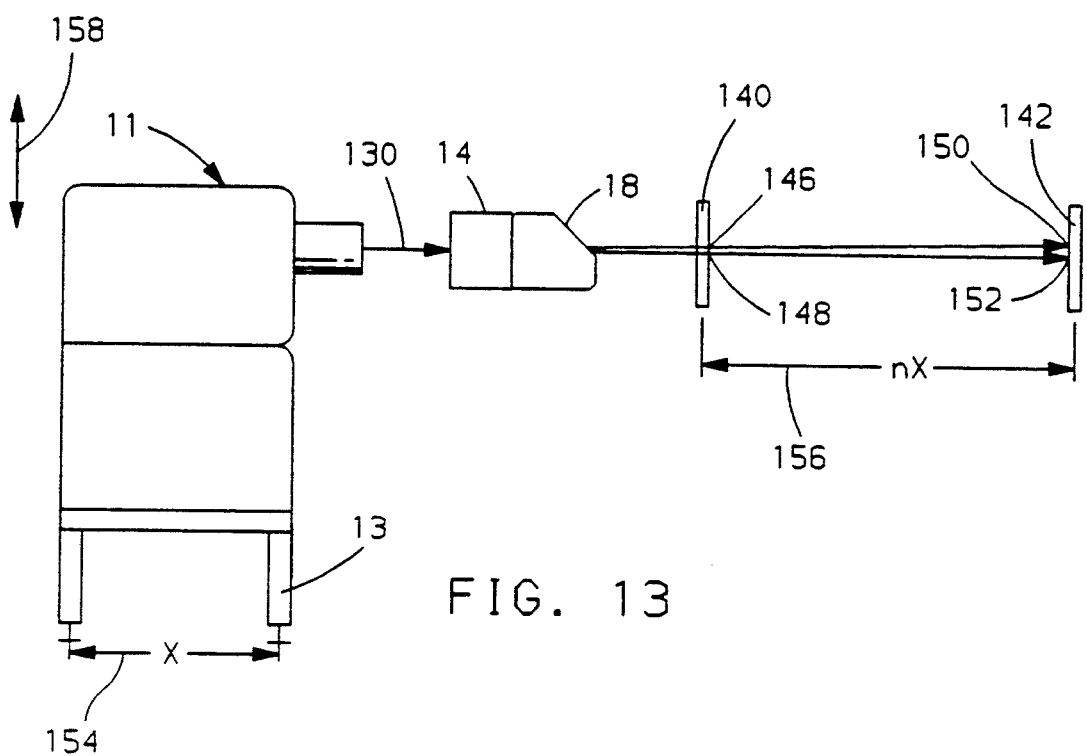
Figure 14:
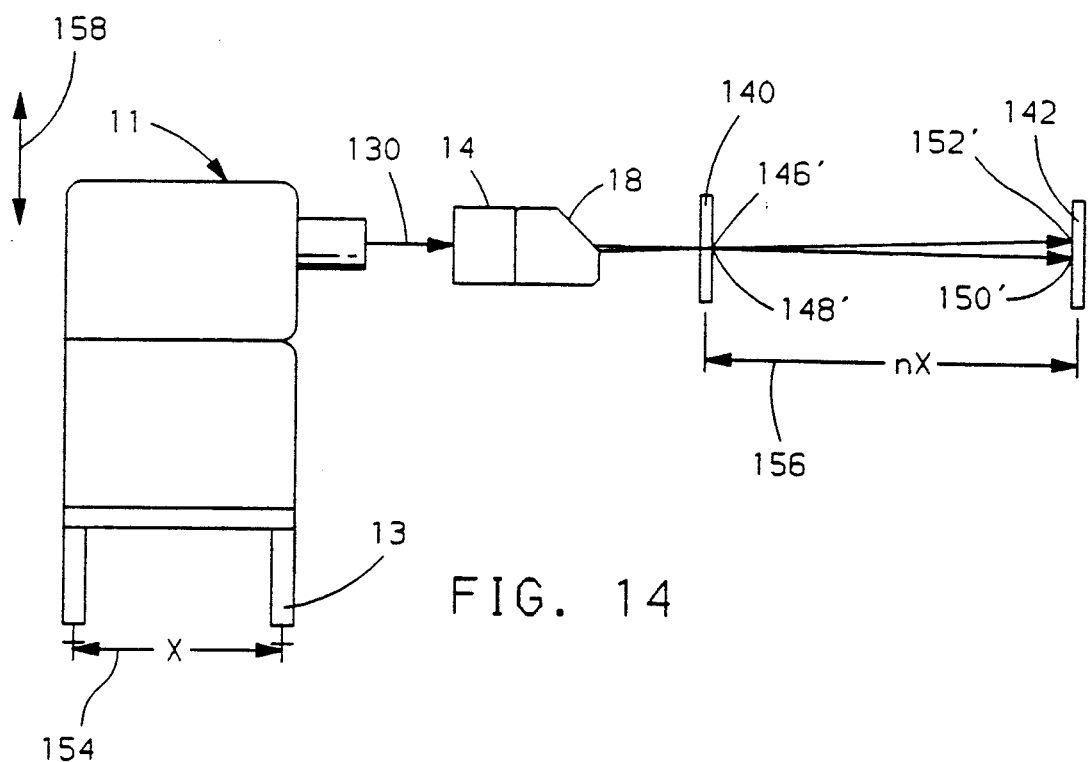

Referring to FIGS. 13 and 14, points 146 and 148 represent possible locations of the HeNe beam and $CO_2$ beam, respectively, on the first target 140. Points 150 and 152 represent possible locations of the HeNe beam and $CO_2$ laser beam, respectively, on the second target 142. The vertical distance between the two points in the first target 140 is measured as the distance A and the vertical distance between the two points on the second target 142 is measured the vertical distance B. Adjustment of the laser unit is summarized as follows.

If the laser beam paths do not cross between the two targets 140 and 142 as illustrated in FIG. 13, then the distance 158 of vertical adjustment of the back end of the laser generator D equals $(B-A)/n$. If, on the other hand, the laser beam's path is crossed at a point between the first target 140 and the second target 142 as illustrated in FIG. 14, the distance 158 of the vertical adjustment of the back end of the laser generator riser 13 equals $(A+B)/n$. After each adjustment of the laser generator, the alignment procedure shown in FIGS. 10 and 11 is repeated to ensure proper location of the laser beam with respect to the HeNe unit 14 and the entire process is repeated. After vertical alignment is obtained, the process described with reference to FIGS. 10-14 is repeated in a similar manner for horizontal alignment. Through iteration of the above process in the vertical and horizontal directions, accurate alignment of the laser beam with respect to the beam bender 18 and the HeNe unit 14 is assured.

To provide alignment of the laser generator, the laser generator riser may be constructed as follows. The typical laser generator riser has four feet on which it stands. For alignment as described above, each foot has a vertical jack screw and an associated threaded plate threadably engaging the vertical jackscrew. Each vertical jackscrew also engages a plate mounted to the plant floor and vertical adjustment at each leg is accomplished by rotation of the vertical jack screw.

Each leg of the laser generator riser also has an associated horizontal jack screw with a horizontal axis perpendicular to the horizontal direction of the laser beam. Each horizontal jack screw is threadably engaged with a vertical plate mounted to the plant floor and rotationally engaged with a foot of the laser generator riser. Through rotation of the horizontal jack screws, horizontal side to side adjustment of the laser generator is achieved.

Alignment of the beam delivery robot is completed prior to alignment of the generator because the robot is permanently mounted in place and all the other components must be aligned to the robot beam aperture. Briefly, the robot beam aperture is set and the beam bender is aligned to the robot aperture in a manner well known to those skilled in the art. The laser generator is then aligned to the beam bender as described herein.

To improve isolation of the beam bender unit form floor vibrations, the tubular structure of the riser may be filled with sand or other dampening material.

The above descriptions of the invention are illustrative examples. Various improvements and modifications to the above example illustrations may occur to those skilled in the art and will fall within the scope of this invention as set forth below.

The embodiments of the invention in which an exclusive property or privilege is claimed are defined as follows:

1. An apparatus comprising:
   a laser generator for providing a laser beam;
   a first laser beam delivery tube, connected to the laser beam generator, through which the laser beam travels in a horizontal direction;
   a beam bender, receiving the laser beam from the first laser beam delivery tube and deflecting the laser beam;
   a second laser delivery tube receiving the laser beam from the beam bender and through which the laser beam travels in a vertical direction;
   a laser delivery robot, receiving the laser beam from the second laser delivery tube;
   a beam bender support unit comprising a base, a riser, and first and second vertical support plates welded to two side faces of the riser and to the base, the beam bender support unit also comprising a horizontal support arm and first and second arm support plates mounted to the two side faces of the vertical riser and to the horizontal support arm, wherein the beam bender has increased isolation from floor vibrations; and a three-axis adjustable head to which the beam bender is mounted providing adjustment of the location of the beam bender in first and second horizontal directions and a third vertical direction.

2. The apparatus set forth in claim 1 comprising first, second and third sliding plates in the adjustable head for slidably adjusting the mounting head in the first, second and third directions.

3. The apparatus set forth in claim 2 also comprising first, second and third jack screws for adjusting the first, second and third sliding plates in the first, second and third directions.

4. The apparatus set forth in claim 1 also comprising a wall dividing a laser generator and a laser delivery robot.

5. The apparatus set forth in claim 1 also comprising a beam shield mounted on the adjustable head.

6. The apparatus set forth in claim 5 wherein the beam shield is pivotable between the first and second positions, wherein the first position is in a path of a laser beam and the second position is out of the path of the laser beam.

7. The apparatus set forth in claim 1 wherein the laser generator is a $CO_2$ laser generator.

8. The apparatus set forth in claim 1 wherein the vertical riser comprises six-inch tube steel.

9. The apparatus set forth in claim 1 wherein the horizontal support arm comprises six-inch tube steel.

10. The apparatus set forth in claim 1 wherein the beam bender support unit and the laser delivery robot are both fixedly mounted to a common steel plate.

* * * * *